United States Patent
Ruiz Molinero et al.

(10) Patent No.: US 12,068,716 B2
(45) Date of Patent: Aug. 20, 2024

(54) ANTI-TORSION DEVICE FOR A SOLAR TRACKER WITH A ROTATION AXIS, AND SOLAR TRACKER COMPRISING SAID ANTI-TORSION DEVICE

(71) Applicant: NCLAVE RENEWABLE, S.L., Madrid (ES)

(72) Inventors: Abraham Ruiz Molinero, Madrid (ES); Diego Lopez Zozaya, Madrid (ES)

(73) Assignee: NCLAVE RENEWABLE, S.L., Madrid (ES)

(*) Notice: Subject to any disclaimer, the term of this patent is extended or adjusted under 35 U.S.C. 154(b) by 307 days.

(21) Appl. No.: 17/612,811

(22) PCT Filed: May 21, 2019

(86) PCT No.: PCT/ES2019/070335
§ 371 (c)(1),
(2) Date: Mar. 18, 2022

(87) PCT Pub. No.: WO2020/234488
PCT Pub. Date: Nov. 26, 2020

(65) Prior Publication Data
US 2022/0216822 A1    Jul. 7, 2022

(51) Int. Cl.
H02S 20/32    (2014.01)
(52) U.S. Cl.
CPC .................................. *H02S 20/32* (2014.12)
(58) Field of Classification Search
CPC ...... H02S 20/30; H02S 20/32; F24S 2030/19; F24S 2030/133
See application file for complete search history.

(56) References Cited

U.S. PATENT DOCUMENTS

| 4,387,702 A | 6/1983 | Murphy et al. |
| 2006/0096586 A1 | 5/2006 | Hayden |

(Continued)

FOREIGN PATENT DOCUMENTS

| DE | 102012013211 A1 * | 2/2013 | ............ B66B 5/185 |
| KR | 799771 B1 * | 2/2008 | ............ A01M 1/02 |
| WO | WO-2014128038 A1 * | 8/2014 | ............ F24J 2/5431 |

OTHER PUBLICATIONS

WO-2014128038-A1 English machine translation (Year: 2014).*

(Continued)

*Primary Examiner* — Andrew J Golden
(74) *Attorney, Agent, or Firm* — Lucas & Mercanti, LLP

(57) ABSTRACT

An anti-torsion device of a solar tracker with a rotation axis, and solar tracker comprising the anti-torsion device, the device having a coupling part fixedly attached rotationally with respect to the rotation axis of the solar tracker; an extension element arranged mechanically and fixedly attached to the coupling part, further extending radially and externally with respect to the coupling part; and, an actuator and a counter-actuator arranged in a locked position, where they are in contact with the extension element, and a released position, where they are separated with respect to the extension element, when the anti-torsion device is fixedly arranged with respect to the rotation axis and in accordance with the locked position, the extension element is rotationally immobilized so that the rotation of the coupling part is further prevented.

5 Claims, 3 Drawing Sheets

(56) References Cited

U.S. PATENT DOCUMENTS

| | | |
|---|---|---|
| 2009/0095283 A1 | 4/2009 | Curtis et al. |
| 2018/0091088 A1* | 3/2018 | Barton .................... H02S 20/32 |
| 2018/0226915 A1 | 8/2018 | Henderson et al. |

OTHER PUBLICATIONS

DE-102012013211-A1 English machine translation (Year: 2013).*
KR-799771-B1 English machine translation (Year: 2008).*
International Search Report for Corresponding International Application No. PCT/ES2019/070335 dated Sep. 20, 2019 and English translation; 6 pages.

* cited by examiner

ANTI-TORSION DEVICE FOR A SOLAR TRACKER WITH A ROTATION AXIS, AND SOLAR TRACKER COMPRISING SAID ANTI-TORSION DEVICE

CROSS REFERENCE TO RELATED APPLICATION

This Application is a 371 of PCT/ES2019/070335, filed on May 21, 2019, which is incorporated herein by reference.

TECHNICAL FIELD

The present invention is related to the industry dedicated to solar trackers, and more specifically to the industry dedicated to solar trackers with a rotation axis for orienting a surface for receiving rays of sun.

STATE OF THE ART

At present, solar trackers with a rotation, or elevation, axis for orienting a surface for receiving rays of sun are widely known.

According to these solar trackers, one of the most important structural loads that occur during the operation of the solar trackers with the rotation axis are the torsional loads along a tube that acts as the rotation, or elevation, axis of the tracker.

Occasionally, this load is generated by a net pressure difference in opposite areas of the solar trackers or areas separated by the surface for receiving the rays of sun, as a consequence of windward and leeward winds since this causes a pressure difference that translates into torque acting on the rotation axis, or tube.

An effect derived from these moments or torques is a torsional deformation along the tube, or rotation axis. This tendency to said deformation accumulates from actuation points of the rotation axis for the rotation thereof and in opposite directions along the tube itself so that the greatest torsional deformations are reached at the ends of the tube, or rotation axis.

This torsional deformation generates a change in the aerodynamic shape coefficients of the solar trackers, which requires performing an iterative second-order calculation until the stability point of the solar trackers is achieved. This calculation is highly complex.

At the actuation points of said tubes to be rotated and to vary the orientation regarding the surface for receiving rays of sun with respect to said sun, there is a braking or locking of the tube against the torsional deformation of the tube or the rotation axis through actuating means used in the rotation of the axis to adapt the orientation of the solar tracker, and more specifically of the surface for receiving rays of sun that it has.

This solution provides a very limited solution, since it only applies to the actuation points of the tube and a limited longitudinal extension from said points in opposite directions.

These tubes, or these rotation axes, have a longitudinal extension of several metres, so that they are arranged in a greater proportion exposed to the corresponding torsional deformation.

Currently, the existing solution consists of compensating the torques by using materials or oversizing so that said rotation, or elevation, axes are more resistant. However, this solution results in substantially heavier and more expensive solar trackers.

In view of the described drawback or limitation presented by the currently existing solutions, a solution is necessary to eliminate the torsional deformation of the rotation axes, or tubes, while avoiding an increase in the number of actuation points of said tubes according to the arrangement of the corresponding actuating means.

OBJECT OF THE INVENTION

With the aim of meeting this objective and solving the aforementioned technical problems, in addition to providing additional advantages that can be derived later on, the present invention provides an anti-torsion device of a solar tracker with a rotation axis, in addition to the solar tracker comprising said anti-torsion device.

The anti-torsion device comprises a coupling part fixedly attached at least rotationally with respect to the rotation axis of the solar tracker; an extension element arranged mechanically and fixedly attached to the coupling part, further extending radially and externally with respect to the coupling part; and, an actuator and a counter-actuator arranged in such a way that they are positionable in a locked position, where they are in contact with the extension element, and a released position, where they are separated with respect to the extension element.

In this way, and in accordance with the locked position, the extension element is rotationally immobilised in such a way that the rotation of the coupling part is further prevented.

The anti-torsion device therefore provides a weight reduction on the rotation axis by avoiding, for example, excess thicknesses and heavier materials on said rotation axis, in addition to a simplification in calculations of the corresponding solar tracker with a view to determining or correcting occasionally in time an orientation of the solar tracker, and more specifically of a surface for receiving rays of sun comprised in said solar tracker, by limiting or even eliminating torsional deformations in the rotation axis.

Preferably, the locked position and the released position are established by means of the linear movement of the actuator and/or the counter-actuator.

The anti-torsion device preferably comprises at least one irregular contact surface arranged such that it interacts in the contact that can be established by the actuator and/or the counter-actuator with the extension element.

According to a preferred exemplary embodiment, the extension element comprises a laminar part, to be contacted in the locked position and to be movable, being between the actuator and the counter-actuator in the released position. According to this exemplary embodiment, the extension element is immobilised in two directions of rotation of the rotation axis with respect to an imaginary central longitudinal axis thereof.

According to another preferred exemplary embodiment, the extension element comprises a strip and a connection part, the strip extending from the connection part and to an area between the actuator and the counter-actuator. Thus, the extension element can be immobilised in one of the directions of rotation of the rotation axis.

According to this other preferred embodiment, and optionally, there are two connection parts and two strips comprised in the extension element, the connection parts being angularly displaced relative to each other with respect to the coupling part such that, the anti-torsion device being arranged in the solar tracker, each of the connection parts is located in correspondence with one side of an imaginary plane for containing the rotation axis and a support axis for arranging the solar tracker on a fixing surface, or terrain. Accordingly, each of the strips extends from one of the connection parts and to the area between the actuator and the counter-actuator. Thus, the extension element can be immobilised in both directions of rotation of the rotation axis.

The solar tracker, moreover, comprises the anti-torsion device as described. Likewise, additionally, said solar tracker can comprise at least one transmission axis to transmit the rotation generated by the motor to the rotation axis according to two actuation points, these points being spaced relative to each other along the rotation axis.

DETAILED DESCRIPTION OF THE INVENTION

The present invention relates to an anti-torsion device of a solar tracker with a rotation axis (1), in addition to a solar tracker comprising said anti-torsion device. The present solar tracker, in addition to said rotation axis (1), comprises a support axis (2) and a surface for receiving rays of sun, which is not represented in the figures.

Accordingly, the solar tracker can be arranged on a fixing terrain or surface by means of the support axis (2), specifically by means of a lower end thereof, while said support axis (2) supports the rotation axis (1), specifically in correspondence with an upper end thereof. Likewise, the surface for receiving rays of sun is fixed with respect to the rotation axis (1), in relation to both longitudinal and turning or rotational movements in an imaginary central longitudinal axis thereof.

The present anti-torsion device provides a highly notable contribution for reducing, or even eliminating, unwanted torsional deformations of the rotation axis (1). Said anti-torsion device comprises a clamp (3) to be arranged, on one side, adapted to an outer contour of the rotation axis (1). The clamp (3) is configured to, in addition to providing an arrangement of the anti-torsion device attached to the rotation axis (1), provide a contact such that it is arranged immobilised on said rotation axis (1). Accordingly, the clamp (3) is arranged in such a way that it is prevented from being moved in a rotational or angular manner, preferably in addition to linearly, in said rotation axis (1).

Preferably, the clamp (3) completely embraces or surrounds the outer perimeter contour of the rotation axis (1) to provide a complete transmission of stresses between them. Likewise, the clamp (3) is preferably made of a metallic material.

According to what has been described, the anti-torsion device comprises a coupling part (3') in correspondence with the clamp (3), said coupling part (3') fixedly attached rotationally, and preferably also longitudinally, with respect to the rotation axis (1) of the solar tracker.

Figure 1:
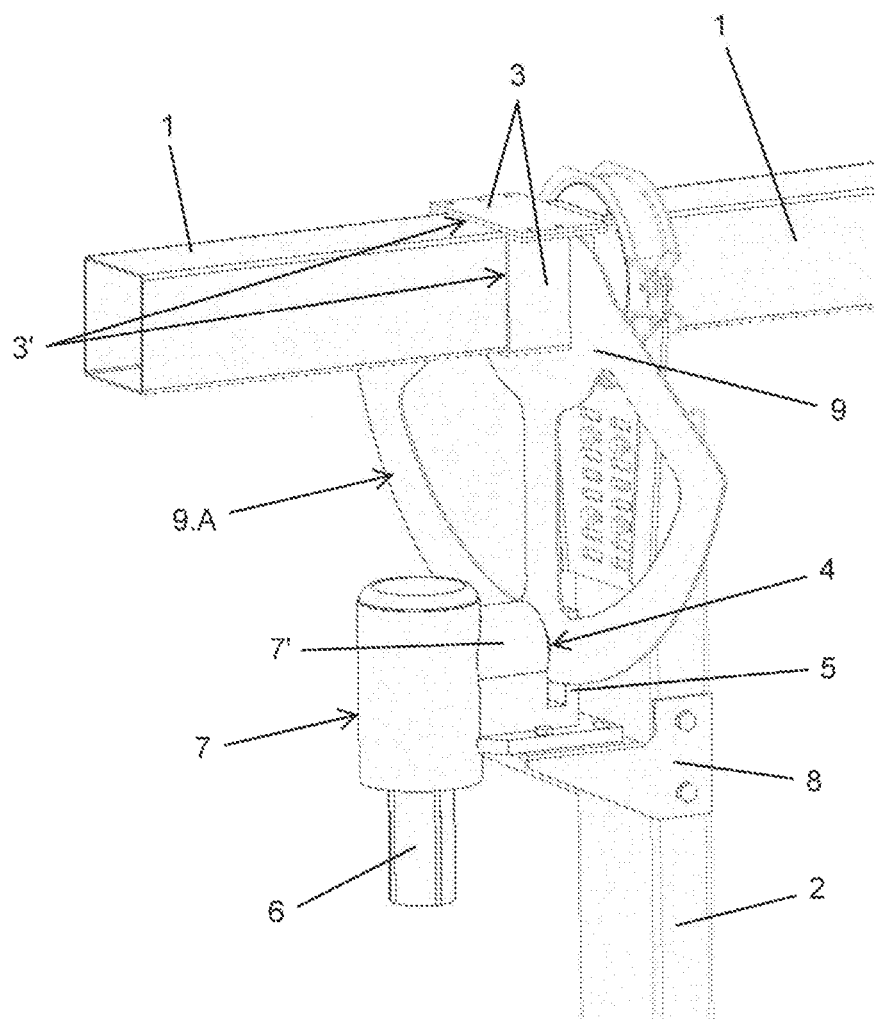
FIG. 1 shows a schematic perspective view of an anti-torsion device of a solar tracker with a rotation axis object of the invention, according to a first preferred embodiment.

The anti-torsion device additionally comprises an actuator (4) and a counter-actuator (5), these being arranged in such a way that a separation distance between them is variable. For this, the actuator (4) is movably arranged, while the counter-actuator (5) is preferably arranged immobile, as can be seen in FIG. 1. Alternatively, and for the same purpose, both the actuator (4) and the counter actuator (5) are movably arranged.

Likewise, the anti-torsion device comprises a trigger (6) and a main body (7), the trigger (6) being fixed to the main body (7). The trigger (6) is preferably selected so that it is electromechanically, hydraulically or pneumatically operable.

The main body (7) is arranged immobilised for a use of the anti-torsion device. Accordingly, preferably, the main body (7) is fixedly attached to the support axis (2), although alternatively for the immobilised arrangement thereof it can be fixedly arranged to another fixed element in space such as an additional axis, which is not shown in the figures.

The anti-torsion device applies the concept of a power screw or, in other words, the anti-torsion device acts as a power screw. The actuator (4) is arranged at a free end of a threaded axis, not shown for reasons of clarity, which is arranged threaded into a threaded portion (7') of the main body (7). In this way, the actuator (4) is linearly movable with respect to the main body (7) according to a rotation of said threaded axis. Accordingly, the actuator (4) is carried by the main body (7).

In the case of both the actuator (4) and the counter-actuator (5) being movable, said threaded axis has another additional thread, that is, it has two threads, so that said threads are opposite each other. In this way, one of the threads is definable to the left and the other of the threads to the right. Accordingly, the actuator (4) is arranged according to one of the two threads and the counter-actuator (5) according to the other of the two threads.

Thus, by blocking an angular rotation of the actuator (4) and the counter-actuator (5), according to the direction of rotation applied or transmitted to the threaded axis through the trigger (6), the present anti-torsion device provides a linear movement both of the actuator (4) and of the counter-actuator (5) so that they jointly approach or move away from each other.

The linear displacement of the actuator (4), and optionally also that of the counter-actuator (6), provides the ability to be moved with a greater torque in the movements thereof.

Figure 2:
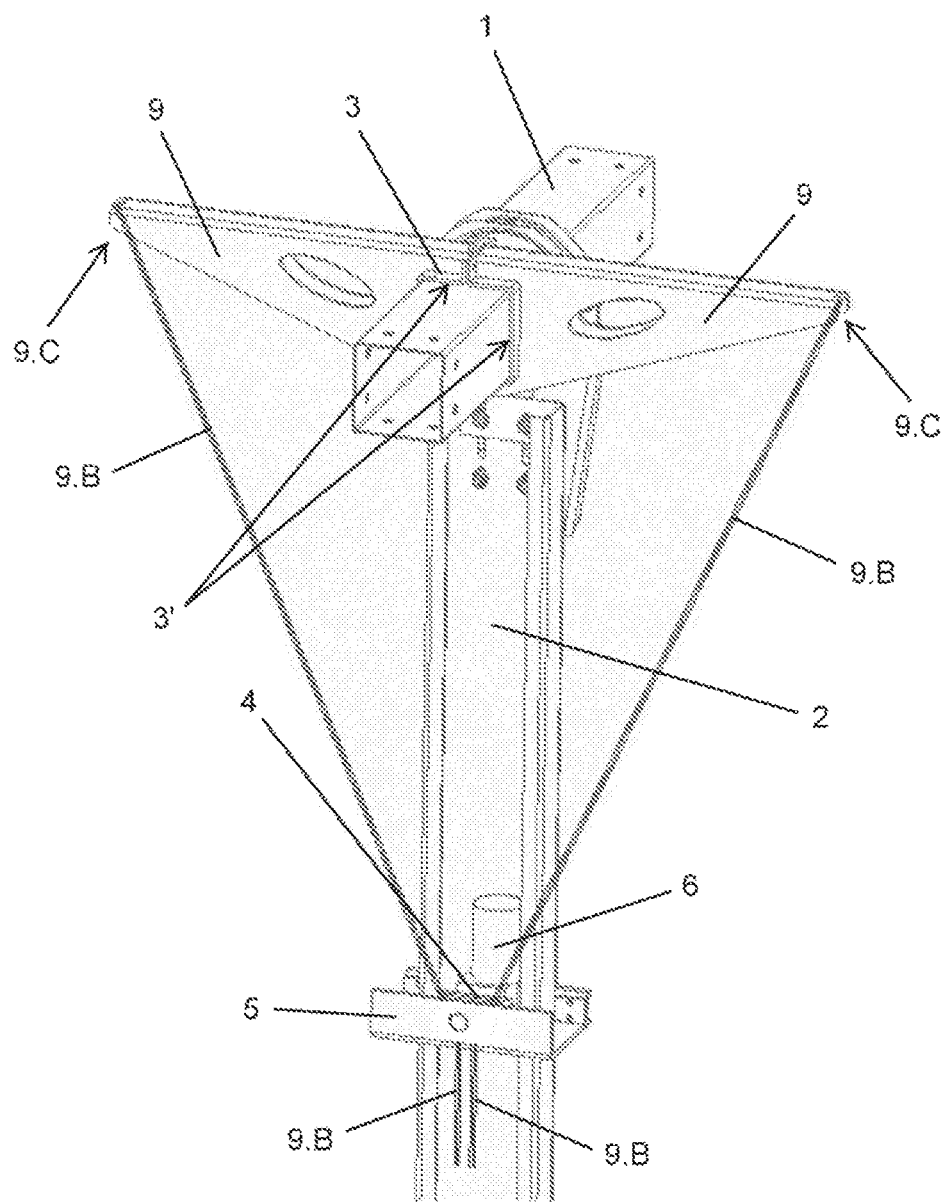
FIG. 2 shows a schematic perspective view of the anti-torsion device of a solar tracker with a rotation axis object of the invention, according to a second preferred embodiment.

Optionally, the anti-torsion device comprises a fixing element (8) to arrange the main body (7) fixed, preferably, on the support axis (2), as can be seen in FIG. 1. Alternatively, the counter-actuator (5) itself can act as said fixing element of the main body (7), as can be derived from viewing FIG. 2.

The present anti-torsion device comprises at least one extension element (9) arranged mechanically and fixedly attached to the coupling part (3'), and more specifically to the clamp (3). Said extension element (9) extends radially and externally with respect to the coupling part (3'), or the clamp (3). In this way, the extension element (9) extends radially and externally with respect to the rotation axis (1), the anti-torsion device being arranged in the solar tracker according to an arrangement for use of said device.

According to a first preferred embodiment, the extension element (9) comprises a laminar part (9.A). The laminar part (9.A) is configured by way of a flat plate, platen or disc, so that it is spaced with respect to the coupling part (3').

As can be seen in FIG. 1, both the extension element (9) and the said laminar part (9.A) preferably correspond to an angular portion with respect to the imaginary central longitudinal axis of the corresponding rotation axis (1).

According to a second preferred embodiment, the extension element (9) comprises at least one strip (9.B), and preferably two. The strip (9.B) is selected by way of an elongated element with resistance to tensile stresses. Preferably, the strip (9.B) is a mechanical cable, although it can be a belt, a girth, a strap or other similar element. Likewise, the strip (9.B) is preferably made of a metallic material with resistance to corrosion.

According to this second preferred embodiment, the extension element (9) comprises at least one connection part (9.C), and preferably at least two to act in two directions of rotation of the rotation axis (1) instead of only in one of them. The directions of turning, or rotation, of the rotation axis (1) are definable with respect to the imaginary central longitudinal axis thereof.

These connection parts (9.C) are arranged in accordance with at least one body, preferably a laminar body, so that they are located at a distance with respect to the coupling part (3'). In turn, each of said connection parts (9.C) is arranged such that, according to the arrangement for use of the present device, it can be located on one side of an imaginary plane for containing the rotation axis (1) and the support axis (2). That is to say, the connection parts (9.C) are arranged such that on each of the two sides definable by the imaginary plane for containing the rotation axis (1) and the support axis (2) one of said connection parts (9.C) is located to act in the two directions of rotation of the rotation axis (1).

Thus, preferably, and two strips (9.B) being comprised in the extension element (9), each of the strips (9.B) extends from one of the connection parts (9.C) and to the area between the actuator (4) and the counter-actuator (5), preferably forming a "V". See FIG. 2. In this way, the extension element (9) can be immobilised in both directions of rotation of the rotation axis (1).

There only being one strip (9.B) and one connection part (9.C) comprised in the extension element (9), the strip (9.B) is arranged extending from the connection part (9.C) and to the area between the actuator (4) and the counter actuator (5). Thus, the extension element (9) can be immobilised in one of the two directions of rotation of the rotation axis (1).

Alternatively, there being one strip (9.B) comprised in the extension element (9), this strip (9.B) extends along said extension element (9) passing in correspondence with the two connection parts (9.C) until arranging two parts thereof, preferably longitudinal ends, in an area for approaching, or even being in contact, with each other. This area preferably corresponds to the area between the actuator (4) and the counter-actuator (5). Thus, the extension element (9) can be immobilised in both directions of rotation of the rotation axis (1), there being one strip (9.B) and two connection parts (9.C).

As described, the actuator (4) and the counter-actuator (5) are positionable in a locked position, where they are in contact with the extension element (9) according to an immobilisation force so that it is immobilised or prevented from being moved in space, and a released position, where they are separated with respect to the extension element (9) such that it is free from the immobilisation force or stresses applied thereto.

Thus, according to the first preferred embodiment, the actuator (4) and the counter-actuator (5) are positionable by specifically being in contact with the laminar part (9.A), in accordance with the locked position; while said laminar part (9.A) is arranged such that it is movable, being able to be located between the actuator (4) and the counter-actuator (5) in accordance with the released position.

Also, according to the second preferred embodiment, the actuator (4) and the counter-actuator (5) are positionable by specifically being in contact with the strips (9.B) comprised in the extension element (9), in accordance with the locked position; while said strips (9.B) are arranged such that they are movable, being able to be located between the actuator (4) and the counter-actuator (5) in accordance with the released position.

According to said second preferred embodiment, the locked position provides a resistance, or even an immobilisation, of the coupling part (3') and the clamp (3), as well as of the extension element (9), in one of the directions of rotation of the rotation axis (1) in accordance with each of the strips (9.B) arranged in correspondence with one of the sides of the previously described imaginary containment plane. This resistance, or immobilisation, is determined, at least, by the tensile strength of said strips (9.B).

As described, according to the first preferred embodiment and the second preferred embodiment, the locked position corresponds to an angular or rotational immobilisation of the extension element (9), and more specifically of the laminar part (9.A) or of the connection parts (9.C). In this way, the locked position corresponds to an angular or rotational immobilisation of the coupling part (3'), as well as of the clamp (3), such that it results in an angular or rotational immobilisation of the rotation axis (1), in other words, with an impossibility of torsional deformation in the rotation axis (1).

The actuator (4), and/or the counter-actuator (5), is preferably selected so that, in front of the extension element (9), and more specifically the laminar part (9.A) or the strips (9.B), it provides a dynamic friction coefficient to establish and maintain the locked position. The friction coefficient, in terms of a nominal value, is selected according to the immobilisation force, according to another nominal value, so that together they determine a friction load in order to establish the described locked position.

Additionally or alternatively, at least one contact surface that interacts in the contact that can be established by the actuator (4) and/or the counter-actuator (5) with the extension element (9), and more specifically with the laminar part (9.A) or with the strips (9.B), is irregular or not smooth in order to establish and maintain the locked position. Accordingly, said contact surfaces may have grooves, knurling or the like.

In this way, additionally or alternatively, the immobilisation and the maintenance of said immobilisation in accordance with the said locked position is by a contact in accordance with the corresponding contact surfaces of the actuator (4), the counter-actuator (5) and/or the extension element (9), at least one of them being irregular. The irregularities are determined according to the immobilisation force so that together they determine the friction load in order to establish the described locked position.

Thus, the locked position can be established according to at least the immobilisation force, together with the friction coefficient and/or at least one of the contact surfaces which is irregular.

In the event that the unwanted tendency to rotate or turn the rotation axis (1) exceeds, or is greater than, the friction load as a consequence of the immobilisation force provided by the anti-torsion device in accordance with the locked position, the extension element (9) slides or is moved with respect to the actuator (4) and the counter-actuator (5).

In this way, at least the torsional deformation is limited while avoiding a breakage or damage to the anti-torsion device, since the locked position is not conditioned by a meshing or engagement of teeth or threads of threaded areas. Thus, both in use and in case of failure in the operation of the anti-torsion device, a savings or a reduction in the total cost of the present solution is provided.

In accordance with the above, the trigger (6) is selectively operable, that is, the anti-torsion device can be arranged in accordance with the released position and be arranged in accordance with the locked position in the event of the trigger (6) being operated. The locked position can be maintained for a certain time such that actuating the trigger (6), or actively using the present device, is limited to specific situations or periods of time.

This, in addition to energy savings, provides locking against unwanted torsional deformations during moments such as storms, blizzards and air gusts, as well as during maintenance and cleaning tasks, while it can be maintained wear free during moments when the rotation axis (1) is safe from torsionally deforming in an unwanted manner.

Additionally, the solar tracker of the invention preferably comprises actuating means (10) for turning or rotating the rotation axis (1). Preferably this rotation is with respect to the imaginary central longitudinal axis thereof. These actuating means comprise a motor (10), preferably electric. Accordingly, the actuating means are configured such that they determine an actuation point (10') by means of meshing of teeth of a toothed area or of threads of a threaded area of the motor (10) with complementary elements associated with the rotation axis (1) in order to transmit a rotational movement to said rotation axis (1).

Likewise, this meshed arrangement between the motor (10) and the rotation axis (1), in accordance with the actuation point (10'), in turn provides a retention or locking against an undesired rotation or turning of the rotation axis (1) that tends to the torsional deformation thereof.

The rotation axis (1) is subjected to unwanted tendencies to be rotated, generally due to external factors such as those derived from or the result of contact by people or air currents. These contacts result in torques transmitted to the rotation axis (1) such that they tend to be torsionally deformed, especially, or to a greater degree, at points far from the actuation point (10'). Said torsional deformation has a special impact on the surface for receiving rays of sun, and more specifically on the orientation thereof.

In the present solar tracker, with the aim of providing efficient transmission of the rotation generated by the motor (10), the actuating means preferably comprise one or two transmission axes (11) to transmit the rotation generated by the motor (10) to the rotation axis (1) in accordance with at least two of the actuation points (10'), these being spaced relative to each other. This arrangement of the transmission means is especially relevant when the rotation axis (1) is of great length, for example equal to or greater than 6 or 10 metres. See FIG. 3.

In this way, and according to said meshed arrangement in accordance with at least two of the actuation points (10') longitudinally spaced relative to each other along the rotation axis (1) by each of the motors (10), locking against unwanted rotation or turning of the rotation axis (1) is additionally provided along a greater longitudinal extension of the said axis (1) in accordance with said actuation points (10). In other words, by arranging the said actuation points (10'), the torsional deformation of the rotation axis (1) is avoided along a greater longitudinal extension of the said axis (1).

Therefore, a reduction or elimination of the unwanted torsional deformation of the rotation axis (1) is in turn provided, covering a greater length thereof, as well as a more effective and less mechanically demanding transmission of the rotation of the motor (10). This described meshed arrangement provides a distribution of the torque to be overcome at more than one point, which is structurally and mechanically less demanding with regard to the corresponding solar tracker. In turn, the torque generated and transmitted by the motor (3) is received by the rotation axis (1) in a distributed manner, which, likewise although in the opposite way, is structurally and mechanically less demanding with respect to the corresponding solar tracker.

Figure 3:
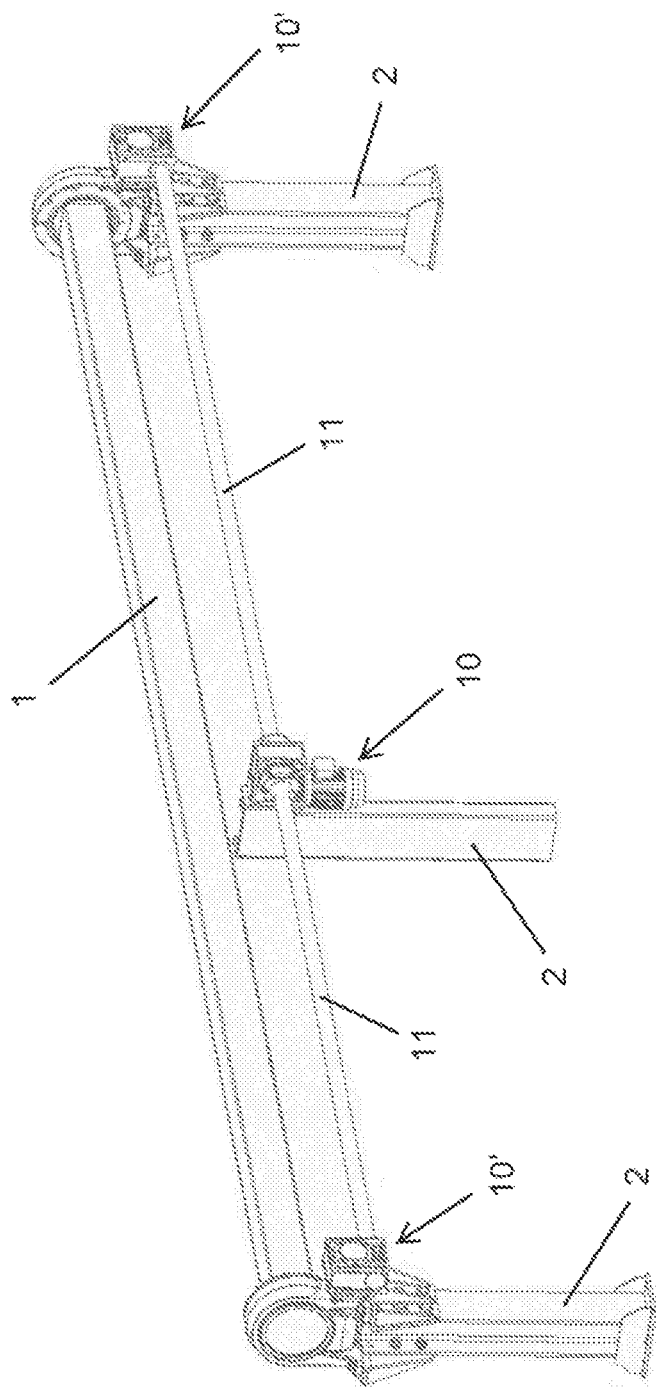
FIG. 3 shows a partial schematic perspective view of a solar tracker with a rotation axis object of the invention.

Despite FIG. 3 not showing the use or arrangement of two of the actuation points (10') in accordance with the motor (10), together with the anti-torsion device, both aspects are preferably combined to orient the surface for receiving rays of sun in accordance with the rotation of the rotation axis (1) in an effective and economically cheaper manner, the rotation axis being free of the unwanted torsional deformations.

Alternatively, the solar tracker can comprise only one or more of the transmitting axes (11) according to the corresponding actuation points (10'), in addition to the support axis (2) and the surface for receiving rays of sun, in other words, without the present anti-torsion device.

As a consequence of a wind collision with the solar tracker, the corresponding air flow is forced to circulate along two paths, originating on both sides, in accordance with, for example, the surface for receiving the rays of sun or the rotation axis (1), vortexes that are alternately generated. The corresponding vortex shedding is characterised by vibrations in the solar tracker, which are unwanted.

Likewise, as a consequence of the collision between the wind and the solar tracker, galloping is generated, a form of aeroelastic instability similar to that corresponding to the aforementioned vortex shedding, in addition to buffeting. Galloping and buffeting lead to vibrations that negatively affect the use of the corresponding solar tracker.

As described, by means of both the present anti-torsion device and the actuation points (10'), in addition to providing the described reduction or elimination of the unwanted torsional deformation of the rotation axis (1), a reduction or elimination of unwanted vibrations is provided.

The invention claimed is:

1. An anti-torsion device of a solar tracker with a rotation axis, comprising:
    a coupling part fixedly attached at least rotationally with respect to the rotation axis of the solar tracker;
    an extension element arranged mechanically and fixedly attached to the coupling part, further extending radially and externally with respect to the coupling part;
    an actuator and a counter-actuator arranged in such a way that they are positionable in a locked position, where they are in contact with the extension element, and a released position, where they are separated with respect to the extension element;
such that, in accordance with the locked position, the extension element is rotationally immobilised in such a way that the rotation of the coupling part is further prevented, and
    wherein the actuator and counter-actuator are in contact with the extension element when positioned in the locked position, and are separated with respect to the extension element when positioned in the released position,
    wherein the extension element comprises a strip and a connection part, the strip extending from the connection part and to an area between the actuator and the counter-actuator, and
    wherein there are two connection parts and two strips, the connection parts being angularly displaced relative to each other with respect to the coupling part such that, the anti-torsion device being arranged in the solar tracker, each of the connection parts is located in correspondence with one side of an imaginary plane for containing the rotation axis and a support axis for arranging the solar tracker on a fixing surface, while each of the strips extends from one of the connection parts and to the area between the actuator and the counter-actuator.

2. The anti-torsion device according to claim 1, wherein the locked position and the released position are established by means of the linear movement of the actuator.

3. The anti-torsion device according to claim 1, further comprising at least one irregular contact surface arranged such that it interacts in the contact that can be established by the actuator and/or the counter-actuator with the extension element.

4. A solar tracker comprising an anti-torsion device according to claim 1.

5. The solar tracker according to claim 4, further comprising a transmission axis to transmit a rotation generated by a motor to the rotation axis according to at least two actuation points spaced relative to each other along the rotation axis.

* * * * *